United States Patent
Guo et al.

(10) Patent No.: US 10,742,952 B2
(45) Date of Patent: Aug. 11, 2020

(54) THREE DIMENSIONAL RECONSTRUCTION METHOD, APPARATUS AND NON-TRANSITORY COMPUTER READABLE STORAGE MEDIUM THEREOF

(71) Applicant: HTC Corporation, Taoyuan (TW)

(72) Inventors: Jun-Lin Guo, Taoyuan (TW); Yung-Chen Lin, Taoyuan (TW); Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 37 days.

(21) Appl. No.: 16/128,535

(22) Filed: Sep. 12, 2018

(65) Prior Publication Data

US 2019/0098279 A1 Mar. 28, 2019

Related U.S. Application Data

(60) Provisional application No. 62/557,738, filed on Sep. 12, 2017.

(51) Int. Cl.
*H04N 7/18* (2006.01)
*H04N 13/122* (2018.01)
(Continued)

(52) U.S. Cl.
CPC .......... *H04N 13/122* (2018.05); *G06T 7/292* (2017.01); *G06T 7/55* (2017.01); *G06T 7/74* (2017.01);
(Continued)

(58) Field of Classification Search
CPC .. H04N 13/122; H04N 13/344; H04N 13/239; H04N 2013/0081; G06T 7/80;
(Continued)

(56) References Cited

U.S. PATENT DOCUMENTS 9,560,274 B2 * 1/2017 Hirata ................. H04N 5/23232
9,729,788 B2 * 8/2017 Furumura .......... H04N 5/23238
(Continued)

FOREIGN PATENT DOCUMENTS

CN    106980368 A    7/2017
CN    107037880 A    8/2017
(Continued)

OTHER PUBLICATIONS

Ham et al, Poster: wearable input device for smart glasses based on a wristband type motion aware touch panel (Year: 2014).*
(Continued)

*Primary Examiner* — Shan E Elahi
(74) *Attorney, Agent, or Firm* — CKC & Partners Co., LLC

(57) ABSTRACT

A 3D reconstruction method is provided. Positioning signals are received by a signal receiver at a first and a second time spots to determine a HMD displacement vector and a HMD rotation amount. A first and a second images are retrieved by a first camera to determine a first camera rotation amount. A relative rotation amount and a relative displacement vector between the HMD and the first camera are calculated. A first camera displacement vector of the first camera is calculated according to the HMD displacement vector, the HMD rotation amount, the relative rotation amount and the relative displacement vector. Depth information of the first and the second image is obtained based on the first camera displacement vector and the first camera rotation amount. 3D reconstruction is performed according to images retrieved by the first camera and the depth information.

18 Claims, 4 Drawing Sheets

(51) Int. Cl.
*G06T 7/55* (2017.01)
*G06T 7/80* (2017.01)
*G06T 7/292* (2017.01)
*G06T 7/73* (2017.01)
*H04N 13/344* (2018.01)
*H04N 13/239* (2018.01)
*H04N 13/00* (2018.01)

(52) U.S. Cl.
CPC ............. *G06T 7/80* (2017.01); *H04N 13/239* (2018.05); *H04N 13/344* (2018.05); *G06T 2207/10028* (2013.01); *G06T 2207/30244* (2013.01); *H04N 2013/0081* (2013.01)

(58) Field of Classification Search
CPC .. G06T 7/292; G06T 7/74; G06T 7/55; G06T 2207/10028; G06T 2207/30244
USPC .......................................................... 375/47
See application file for complete search history.

(56) References Cited

U.S. PATENT DOCUMENTS

| | | | | |
|---|---|---|---|---|
| 2007/0258658 | A1* | 11/2007 | Kobayashi | G06T 15/20 382/276 |
| 2008/0297437 | A1* | 12/2008 | Takahashi | G02B 27/017 345/8 |
| 2010/0295924 | A1* | 11/2010 | Miyatani | H04N 13/344 348/46 |
| 2012/0062445 | A1* | 3/2012 | Haddick | G02B 27/017 345/8 |
| 2012/0113209 | A1* | 5/2012 | Ritchey | G02B 27/0172 348/14.02 |
| 2014/0267400 | A1* | 9/2014 | Mabbutt | G06T 19/006 345/633 |
| 2015/0187087 | A1* | 7/2015 | Lee | G06T 7/248 382/107 |
| 2016/0210736 | A1* | 7/2016 | Aruga | H04N 13/344 |
| 2016/0260251 | A1* | 9/2016 | Stafford | G02B 27/0179 |
| 2017/0148206 | A1 | 5/2017 | Donner et al. | |

FOREIGN PATENT DOCUMENTS

| | | |
|---|---|---|
| TW | 201527683 A | 7/2015 |
| TW | 201621557 A | 6/2016 |
| TW | 201633104 A | 9/2016 |
| TW | 201721231 A | 6/2017 |

OTHER PUBLICATIONS

Janin et al, Calibration of head-mounted displays for augmented reality applications (Year: 1993).*
Luo et al, Development of a three-dimensional multimode visual immersive system with applications in telpresence (Year: 2017).*
Adam L. Janin et al., "Calibration of Head-Mounted Displays for Augmented Reality Applications", Virtual Reality Annual International Symposium, 1993 IEEE Seattle, Sep. 18, 1993, pp. 246-255.
Tony Jebara et al., "3D Structure from 2D Motion", IEEE Signal Processing Magazine, May 1, 1999, pp. 66-84.
Behzadan Amir H et al., "Augmented reality visualization: A review of civil infrastructure system applications", Advanced Engineering Informatics, vol. 29, No. 2, Apr. 7, 2015, pp. 252-267.
Li, Jia-Ning et al., "Local optimized and scalable frame-to-model SLAM", Multimedia Tools and Applications, Kluwer Academic Publishers, Boston, US, vol. 75, No. 14, Jul. 22, 2015, pp. 8675-8694.
Corresponding European search report dated Dec. 13, 2018.
Corresponding Taiwan office action dated Feb. 22, 2019.

* cited by examiner

THREE DIMENSIONAL RECONSTRUCTION METHOD, APPARATUS AND NON-TRANSITORY COMPUTER READABLE STORAGE MEDIUM THEREOF

RELATED APPLICATIONS

This application claims priority to U.S. Provisional Application Ser. No. 62/557,738, filed Sep. 12, 2017, which is herein incorporated by reference.

BACKGROUND

Field of Disclosure

The present disclosure relates to three dimensional (3D) technology. More particularly, the present disclosure relates to a 3D reconstruction method, a 3D reconstruction apparatus and a non-transitory computer readable storage medium thereof.

Description of Related Art

In recent years, virtual reality technology is widely used in the fields such as gaming, engineering and military, etc. In order to experience the virtual reality environment, a user needs to view the displayed images through the display apparatus disposed at such as, but not limited a head-mounted device (HMD) wear by the user. The displayed images may be generated from the cameras disposed at the HMD. However, if the depth information of the images retrieved by the cameras or the baseline between the cameras is unknown, the 3D reconstruction can not be performed accurately. Under such a condition, the user is not able to experience the accurate 3D environment.

Accordingly, what is needed is a 3D reconstruction method, a 3D reconstruction apparatus and a non-transitory computer readable storage medium thereof to address the above issues.

SUMMARY

An aspect of the present disclosure is to provide a three dimensional (3D) reconstruction method used in a 3D reconstruction apparatus that includes the steps outlined below. A plurality of positioning signals are received by a signal receiver disposed at a head mounted device (HMD) at a first time spot and a second time spot to determine a HMD displacement vector and a HMD rotation amount according to the positioning signals. A first image at the first time spot and a second image at the second time spot are retrieved by a first camera disposed at the HMD to determine a first camera rotation amount according to the first image and the second image. A relative rotation amount and a relative displacement vector between the HMD and the first camera are calculated. A first camera displacement vector of the first camera is calculated according to the HMD displacement vector, the HMD rotation amount, the relative rotation amount and the relative displacement vector. Depth information of the first image and the second image is obtained based on the first camera displacement vector and the first camera rotation amount. 3D reconstruction is performed according to images retrieved by the first camera and the depth information.

Another aspect of the present disclosure is to provide a 3D reconstruction apparatus used in a HMD that includes a storage module, a signal receiver, a first camera and a processing module. The storage module is configured to store a plurality of computer-executable instructions. The processing module is electrically coupled to the storage module and the signal receiver and is configured to retrieve and execute the computer-executable instructions to perform a reconstruction method when the computer-executable instructions are executed. The reconstruction method includes the steps outlined below. A plurality of positioning signals are received by the signal receiver at a first time spot and a second time spot to determine a HMD displacement vector and a HMD rotation amount according to the positioning signals. A first image at the first time spot and a second image at the second time spot are retrieved by the first camera to determine a first camera rotation amount according to the first image and the second image. A relative rotation amount and a relative displacement vector between the HMD and the first camera are calculated. A first camera displacement vector of the first camera is calculated according to the HMD displacement vector, the HMD rotation amount, the relative rotation amount and the relative displacement vector. Depth information of the first image and the second image is obtained based on the first camera displacement vector and the first camera rotation amount. 3D reconstruction is performed according to images retrieved by the first camera and the depth information.

Yet another aspect of the present disclosure is to provide a non-transitory computer readable storage medium that stores a computer program comprising a plurality of computer-executable instructions to perform a 3D reconstruction method used in a 3D reconstruction apparatus used in a head-mounted device, the 3D reconstruction apparatus at least includes a storage module, a signal receiver, a first camera and a processing module electrically coupled to the storage module, the signal receiver and the first camera and configured to retrieve and execute the computer-executable instructions to perform the 3D reconstruction method when the computer-executable instructions are executed. The 3D reconstruction method includes the steps outlined below. A plurality of positioning signals are received by the signal receiver disposed at a head mounted device (HMD) at a first time spot and a second time spot to determine a HMD displacement vector and a HMD rotation amount according to the positioning signals. A first image at the first time spot and a second image at the second time spot are retrieved by the first camera disposed at the HMD to determine a first camera rotation amount according to the first image and the second image. A relative rotation amount and a relative displacement vector between the HMD and the first camera are calculated. A first camera displacement vector of the first camera is calculated according to the HMD displacement vector, the HMD rotation amount, the relative rotation amount and the relative displacement vector. Depth information of the first image and the second image is obtained based on the first camera displacement vector and the first camera rotation amount. 3D reconstruction is performed according to images retrieved by the first camera and the depth information.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
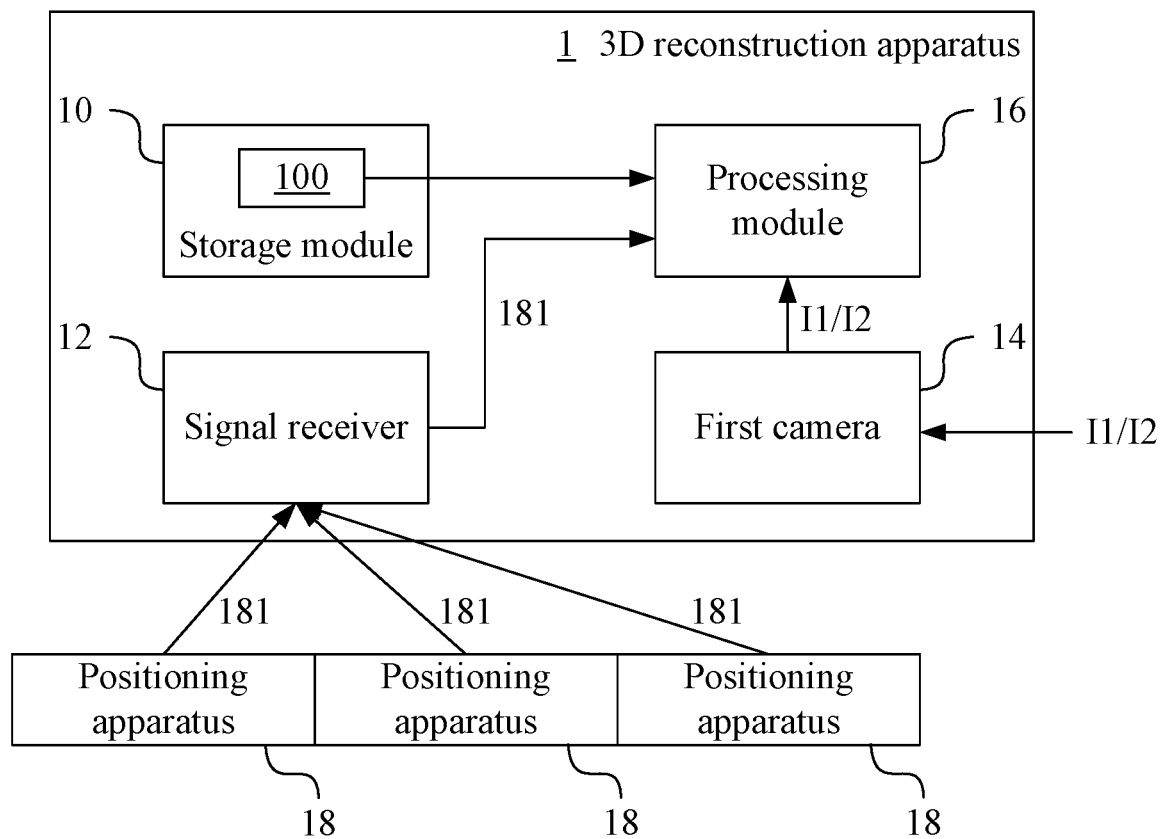
FIG. 1 is a block diagram of a 3D reconstruction apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a block diagram of a 3D reconstruction apparatus 1 in an embodiment of the present invention. In an embodiment, the 3D reconstruction apparatus 1 is used in a head-mounted device (HMD, not illustrated in FIG. 1). More specifically, the components of the 3D reconstruction apparatus 1 are disposed at various positions of the HMD.

The 3D reconstruction apparatus 1 includes a storage module 10, a signal receiver 12, a first camera 14 and a processing module 16.

In an embodiment, the storage unit 10 can be such as, but not limited to CD ROM, RAM, ROM, floppy disk, hard disk or optic magnetic disk. The storage unit 10 is configured to store a plurality of computer-executable instructions 100.

The signal receiver 12 is disposed at the HMD and is configured to receive positioning signals 181 from a plurality of signal positioning apparatus 18. In an embodiment, the signal positioning apparatus 18 are, for example, lighthouses that deliver the positioning signals 181 in the form of such as, but not limited to electromagnetic signals or supersonic signals. As a result, by keeping receiving the positioning signals 181, the motion of the HMD can be determined.

The first camera 14 is configured to retrieve images at different time spots. In an embodiment, the first camera 14 is a camera with either charge coupled device (CCD) or complementary metal oxide semiconductor (CMOS) image sensors.

The processing module 16 is electrically coupled to the storage unit 10. In an embodiment, the processing module 16 is configured to retrieve and execute the computer-executable instructions 100 to operate the function of the 3D reconstruction apparatus 1 accordingly.

More specifically, by receiving the images retrieved by the first camera 14, the processing module 16 is able to perform 3D reconstruction accordingly.

Figure 2:
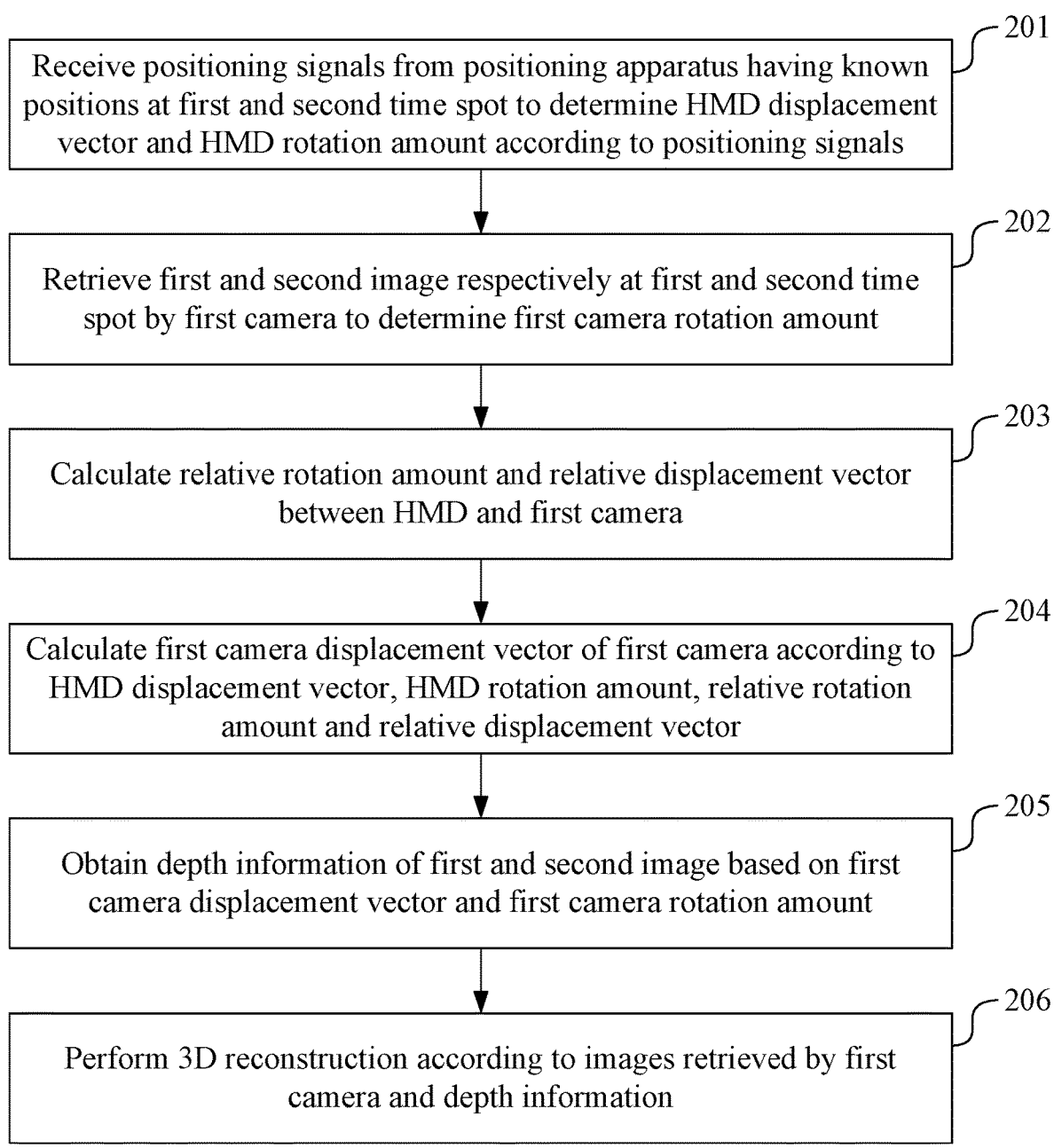
FIG. 2 is a flow chart of a 3D reconstruction method in an embodiment of the present invention.
Figure 3A:
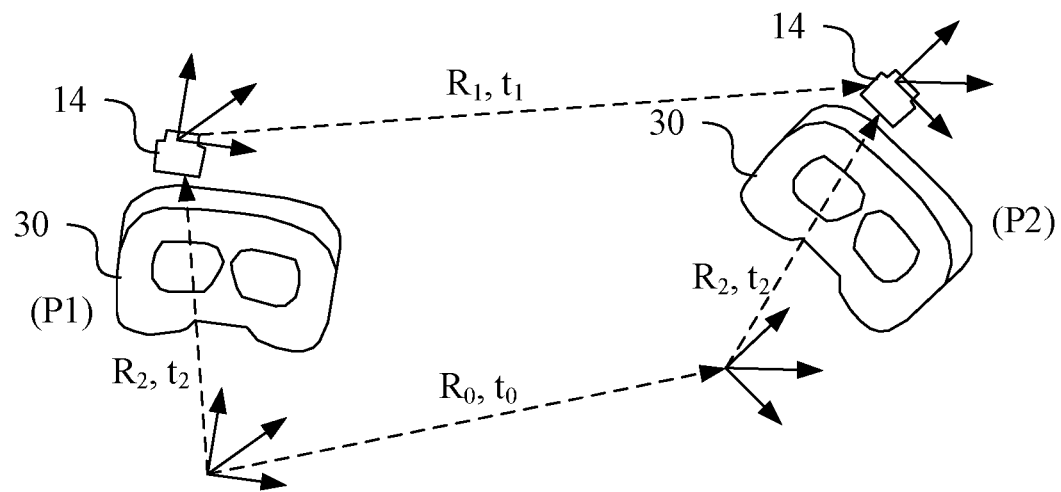
FIG. 3A is a diagram illustrating the motion of a HMD that the 3D reconstruction apparatus locates and the motion of the first camera in an embodiment of the present invention.
Figure 3B:
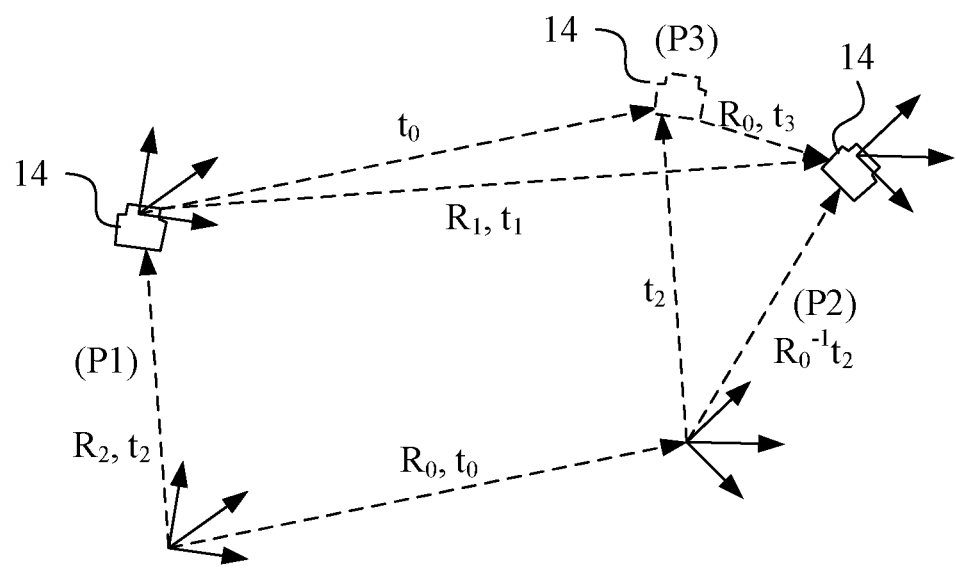
FIG. 3B is a diagram illustrating a decomposed motion of the first camera in FIG. 3A without illustrating the HMD in an embodiment of the present invention.

Reference is now made to FIG. 2, FIG. 3A and FIG. 3B at the same time. The detail of the function of the 3D reconstruction apparatus 1 is described in the following paragraphs in accompany with FIG. 2, FIG. 3A and FIG. 3B.

FIG. 2 is a flow chart of a 3D reconstruction method 200 in an embodiment of the present invention. The 3D reconstruction method 200 can be used in the 3D reconstruction apparatus 1 illustrated in FIG. 1.

FIG. 3A is a diagram illustrating the motion of a HMD 30 that the 3D reconstruction apparatus 1 locates and the motion of the first camera 14 in an embodiment of the present invention. As described above, the first camera 14 is disposed at the HMD 30 as well.

FIG. 3B is a diagram illustrating a decomposed motion of the first camera 14 in FIG. 3A without illustrating the HMD 30 in an embodiment of the present invention.

The 3D reconstruction method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the positioning signals 181 are received from the positioning apparatus 18 by the signal receiver 12 at a first time spot and a second time spot to determine a HMD displacement vector $t_0$ and a HMD rotation amount $R_0$ according to the positioning signals 181.

In an embodiment, the signal receiver 12 may include a plurality of receiver units (not illustrated) disposed on various locations on the HMD 30, in which a geometry center of the HMD 30 and a HMD coordinate-system centered at the geometry center can be calculated based on the distribution of the locations of the receiver units. In detail, the displacement vector and the rotation amount of the HMD coordinate-system can be determined by some well-known algorithms provided with the positioning signals 181 received by the plurality of receiver units. As well known, such algorithms are often formulated in the form to solve the perspective-n-points problem.

When the HMD 30 moves from a first position P1 corresponding to the first time spot to a second position P2 corresponding to the second time spot, as illustrated in FIG. 3A, the motion of the HMD 30 can be determined by the signal receiver 12 according to the positioning signals 181, in which the motion can be expressed as the HMD displacement vector $t_0$ and the HMD rotation amount $R_0$. In an embodiment, the HMD displacement vector $t_0$ is a 3D vector and the HMD rotation amount $R_0$ is expressed as a 3D rotation amount, a quaternion or a rotation matrix.

In step 202, a first image I1 and a second image I2 are retrieved by the first camera 14 respectively at the first time spot and the second time spot to determine a first camera rotation amount $R_1$ according to the first image I1 and the second image I2.

In an embodiment, the first camera rotation amount $R_1$ can be obtained by using known algorithms related to such as, but not limited to epipolar geometry based on the first image I1 and the second image I2, e.g. by calculating the difference of orientations of the objects within the first image I1 and the second image I2.

In step 203, a relative rotation amount $R_2$ and a relative displacement vector $t_2$ between the HMD 30 and the first camera 14 are calculated by using Euclidean transformation matrix.

In an embodiment, though the first camera 14 is disposed at the HMD 30, the position and the orientation of the first camera 14 are different from the position and the orientation of the HMD 30 coordinate-system determined according to the distribution of the location of receiver units. The relative displacement vector $t_2$ and the relative rotation amount $R_2$ exists between the first camera 14 and the HMD 30.

In an embodiment, a motion between a HMD orientation of the HMD 30 at the first time spot (i.e. when the HDM 30 is at the first position P1) to a camera orientation of the first camera 14 at the second time spot (i.e. when the HMD 30 is at the second position P2) is equivalent to a first path and a second path. The first path is to rotate the HMD orientation of the HMD 30 at the first time spot (i.e. when the HMD 30 is at the first position P1) for the HMD rotation amount $R_0$ first and for the relative rotation amount $R_2$ subsequently. The second path is to rotate the HMD orientation at the first time spot for the relative rotation amount $R_2$ first and for the first camera rotation amount $R_1$ subsequently.

By applying Euclidean transformation matrix to describe the first path and the second path, the relation described above can be expressed as:

$$\begin{bmatrix} R_2 & -R_2 t_2 \\ 0^T & 1 \end{bmatrix} \begin{bmatrix} R_0 & -R_0 t_0 \\ 0^T & 1 \end{bmatrix} \quad \text{(equation 1)}$$

$$\begin{pmatrix} X_{HMD} \\ 1 \end{pmatrix} = \begin{bmatrix} R_1 & -R_1 t_1 \\ 0^T & 1 \end{bmatrix} \begin{bmatrix} R_2 & -R_2 t_2 \\ 0^T & 1 \end{bmatrix} \begin{pmatrix} X_{HMD} \\ 1 \end{pmatrix}$$

The right side of the equal sign in equation 1 means transforming $X_{HMD}$ (a coordinate of a point X in the HMD coordinate system) from the HMD coordinate-system at the first time spot to the camera coordinate-system of the first camera 14 at the first time spot, and then transforming to the camera coordinate-system of the first camera 14 at the second time spot. The left side of equation 1 means transforming $X_{HMD}$ from the HMD coordinate-system at the first time spot to the HMD coordinate-system at the second time spot, and then transforming to the camera coordinate-system at the second time spot.

We conclude that the equation 1 holds for any $X_{HMD}$ in 3D-space, so the Euclidean transformation matrix in both sides of the equal sign in the equation 1 are the same, i.e.

$$\begin{bmatrix} R_2 & -R_2 t_2 \\ 0^T & 1 \end{bmatrix} \begin{bmatrix} R_0 & -R_0 t_0 \\ 0^T & 1 \end{bmatrix} = \begin{bmatrix} R_1 & -R_1 t_1 \\ 0^T & 1 \end{bmatrix} \begin{bmatrix} R_2 & -R_2 t_2 \\ 0^T & 1 \end{bmatrix} \quad \text{(equation 2)}$$

Multiplying the matrices in both sides of the equal sign in the equation 1 results in:

$$\begin{bmatrix} R_2 R_0 & -R_2 R_0 t_0 - R_2 t_2 \\ 0^T & 1 \end{bmatrix} = \begin{bmatrix} R_1 R_2 & -R_1 R_2 t_2 - R_1 t_1 \\ 0^T & 1 \end{bmatrix} \quad \text{(equation 3)}$$

Equalizing the corresponding entries of the matrices in both sides of the equal sign in equation 3, we obtain:

$$R_2 R_0 = R_1 R_2 \quad \text{(equation 4)}$$

$$-R_2 R_0 t_0 - R_2 t_2 = -R_1 R_2 t_2 - R_1 t_1 \quad \text{(equation 5)}$$

As a result, since the HMD rotation amount $R_0$ and the first camera rotation amount $R_1$ are known, the relative rotation amount $R_2$ can be solved by using spectral decomposition method and numerical optimization based on the equation 4.

In an embodiment, the motion of the HMD 30 between the first time spot and the second time spot is decomposed to the HMD displacement corresponding to the HMD displacement vector $t_0$ and the HMD rotation corresponding to the HMD rotation amount $R_0$.

Similarly, the motion of the first camera 14 between the first time spot and the second time spot can be decomposed to a first displacement identical to the HMD displacement vector $t_0$ that displaces to a temporary position P3 and a second displacement corresponding to a displacement vector $t_3$, as illustrated in FIG. 3B.

Further, as shown in FIG. 3B, when both of the first camera 14 and the HMD 30 are displaced according to the HMD displacement vector $t_0$ without rotation, the displacement vector between the first camera 14 and the HMD 30 under such a condition is $t_2$. When both of the first camera 14 and the HMD 30 are displaced and rotated to the position corresponding to the second time spot, the displacement vector between the first camera 14 and the HMD 30 can be expressed as $R_0^{-1}t_2$ in the HMD coordinate-system at the second time spot before rotation.

This is because the rotation from "the HMD coordinate-system at the second time spot after rotation" to "the HMD coordinate-system at the second time spot before rotation" is $R_0^{-1}$ (i.e. the inverse matrix of $R_0$). Moreover, the displacement vector between the first camera 14 and the HMD 30 is presented as $t_2$ in "the HMD coordinate-system at the second time spot after rotation" (if the relative position between HMD and camera remains the same during the period in which translation and rotation occurs). Thus the displacement vector between the first camera 14 and the HMD 30 from "the camera at the second time spot before rotation" to "the camera at the second time spot after rotation" is represented as $R_0^{-1}t_2$ in "the HMD coordinate-system at the second time spot before rotation".

Further, the displacement vector $t_3$ can be expressed as $R_0^{-1}t_2-t_2$ in "the HMD coordinate-system at the first time spot". In other words, the HMD coordinate-system at the first time spot has the same orientation as the HMD coordinate-system at the second time spot without rotation, and so any vector has the same coordinate-representation in these two coordinate-systems at different time spots.

As a result, the sum of the displacement vector $t_0$ from the position of the first camera 14 at the first time spot to the temporary position P3 and the displacement vector $t_3$ from the temporary position P3 to the position of the first camera 14 at the second time spot equals to the first camera displacement vector $t_1$, in which such a relation can be expressed as:

$$t_1=t_0+t_3 \qquad \text{(equation 6)}$$

Further, the sum of the displacement vector $t_2$ from the position of the HMD 30 at the second time spot without rotation to the temporary position P3 and the displacement vector $t_3$ from the temporary position P3 to the position of the first camera 14 at the second time spot equals to the displacement vector $R_0^{-1}t_2$, in which such a relation can be expressed as:

$$R_0^{-1}t_2=t_2+t_3 \qquad \text{(equation 7)}$$

By equations 6 and 7, the formula can be further expressed as:

$$t_1=t_0+t_3=t_0+R_0^{-1}t_2-t_2 \qquad \text{(equation 8)}$$

However, the first camera displacement vector $t_1$ described in equations 6 and 8 are substantially under "the HMD coordinate-system at the first time spot". When the first camera displacement vector $t_1$ is under "the camera coordinate-system at the first time spot", a rotation $R_2$ is applied to equation 8 to obtain:

$$t_1=R_2(t_0+R_{09}^{-1}t_2-t_2) \qquad \text{(equation 9)}$$

By substituting equation 9 back to equation 5, the following result is obtained:

$$-R_2R_0t_0-R_2t_2=-R_1R_2t_2-R_1R_2(t_0+R_0^{-1}t_2-t_2) \qquad \text{(equation 10)}$$

By rearranging the equation 10, the following result is obtained:

$$(R_2-R_1R_2R_0^{-1})t_2=-R_2R_0t_0+R_1R_2t_0 \qquad \text{(equation 11)}$$

The relative displacement vector $t_2$ can thus be solved by using equation 11.

In step 204, the first camera displacement vector $t_1$ of the first camera 14 is calculated according to the HMD displacement vector $t_0$, the HMD rotation amount $R_0$, the relative rotation amount $R_2$ between the first camera 14 and the HMD 30 and the relative displacement vector $t_2$ between the first camera 14 and the HMD 30.

More specifically, by substituting $t_2$ back in equation 9, the first camera displacement vector $t_1$ can be obtained.

In step 205, depth information of the first image I1 and the second image I2 is obtained based on the first camera displacement vector $t_1$ and the first camera rotation amount $R_1$.

More specifically, since the first camera displacement vector $t_1$ and the first camera rotation amount $R_1$ are obtained, the real distance of the objects moving between the first image I1 and the second image I2 can be determined. The depth information can thus be obtained.

In step 206, 3D reconstruction is performed according to images, e.g. the first image I1 and the second image I2 retrieved by the first camera 14, and the depth information.

In some approaches, an additional object that has a known size is required to appear in the images taken by the camera for the 3D reconstruction apparatus to obtain the depth information. However, when such an additional object is absent or if such an additional object deforms, the 3D reconstruction apparatus can not obtain the accurate depth information and is not able to perform 3D reconstruction accurately.

The 3D reconstruction apparatus 1 and the 3D reconstruction method 200 in the present invention can establish the depth information according to the information from the positioning signals 181 received by the signal receiver 12 and the images retrieved by the first camera 14. Consequently, the 3D reconstruction can be performed accurately based on the accurate depth information.

It is appreciated that the embodiment is described by using a single camera scheme. In other embodiments, the method described above can be applied to a multi-camera scheme.

Figure 4:
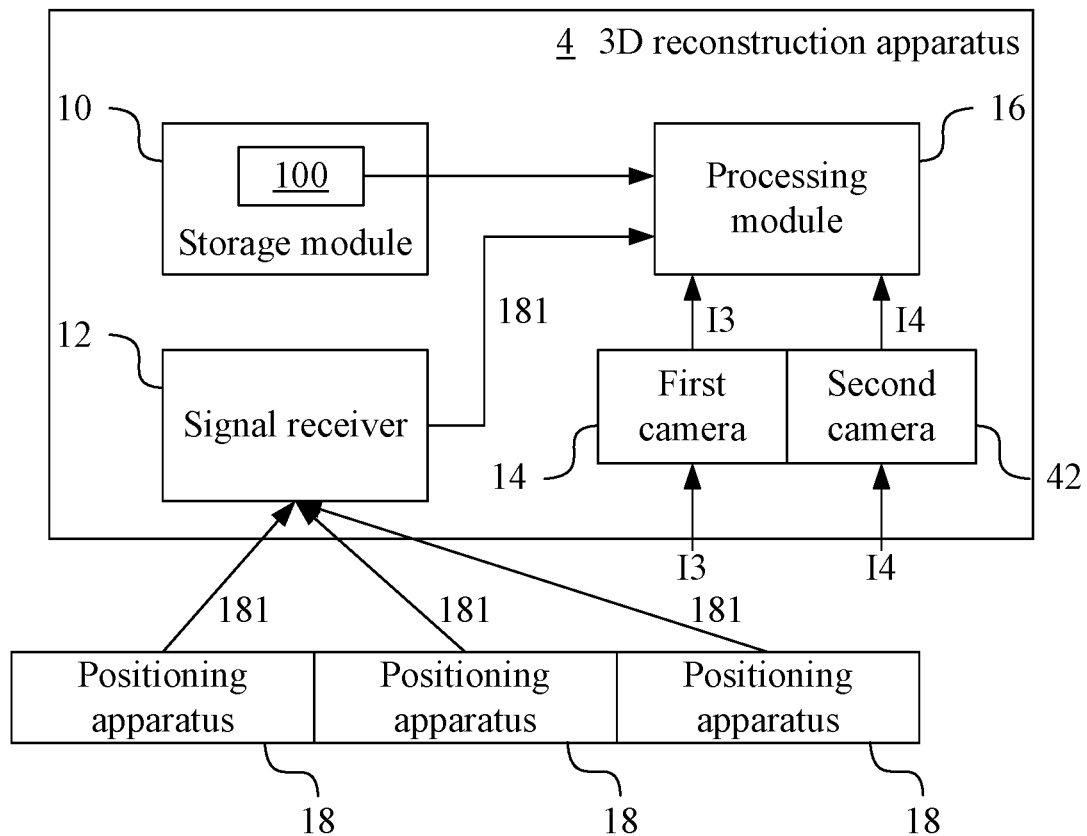
FIG. 4 is a block diagram of a 3D reconstruction apparatus in an embodiment of the present invention.
Figure 5:
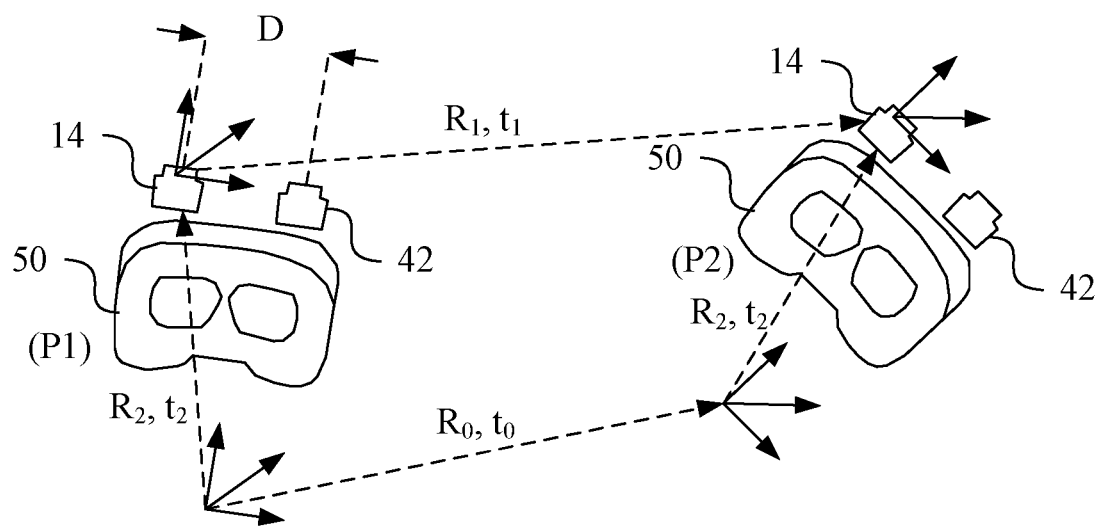
FIG. 5 is a diagram illustrating the motion of a HMD that the 3D reconstruction apparatus locates in an embodiment of the present invention.

Reference is now made to FIG. 4 and FIG. 5 at the same time. FIG. 4 is a block diagram of a 3D reconstruction apparatus 4 in an embodiment of the present invention. FIG. 5 is a diagram illustrating the motion of a HMD 50 that the 3D reconstruction apparatus 4 locates in an embodiment of the present invention.

The 3D reconstruction apparatus 4 in FIG. 4 includes components identical to the 3D reconstruction apparatus 1 illustrated in FIG. 1. As a result, the detail of the identical components is not described herein. However, the 3D reconstruction apparatus 4 further includes a second camera 42.

As illustrated in FIG. 5, both the first camera 14 and the second camera 42 are disposed at the HMD 50. In an embodiment, the first camera 14 is a left camera and the second camera 42 is a right camera. However, in other embodiments, the first camera 14 can be the right camera and the second camera 42 can be the left camera.

In an embodiment, the depth information can be obtained by using either the first camera 14, as illustrated in FIG. 5, or the second camera 42 based on the method described in FIG. 2.

Further, a third image I3 is retrieved by the first camera 14 and a fourth image I4 is retrieved by the second camera 42 at the same time spot. A disparity between the third image I3 and the fourth image I4 can be determined accordingly.

As a result, a length of a baseline between the first camera 14 and the second camera 42, i.e. the distance D between the first camera 14 and the second camera 42 in FIG. 5, can be determined according to the disparity and the depth information. The calibration of the baseline of the duo-camera within the 3D reconstruction apparatus 4 can be accomplished.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A three dimensional (3D) reconstruction method used in a 3D reconstruction apparatus comprising:
   receiving a plurality of positioning signals by a signal receiver disposed at a head mounted device (HMD) at a first time spot and a second time spot to determine a HMD displacement vector and a HMD rotation amount according to the positioning signals;
   retrieving a first image at the first time spot and a second image at the second time spot by a first camera disposed at the HMD to determine a first camera rotation amount according to the first image and the second image;
   calculating a relative rotation amount and a relative displacement vector between the HMD and the first camera;
   calculating a first camera displacement vector of the first camera according to the HMD displacement vector, the HMD rotation amount, the relative rotation amount and the relative displacement vector;
   obtaining depth information of the first image and the second image based on the first camera displacement vector and the first camera rotation amount; and
   performing 3D reconstruction according to images retrieved by the first camera and the depth information.

2. The 3D reconstruction method of claim 1, wherein the HMD rotation amount and the first camera rotation amount are expressed as a 3D rotation amount, a quaternion or a rotation matrix.

3. The 3D reconstruction method of claim 1, further comprising:
   retrieving a third image by the first camera and a fourth image by a second camera disposed at the HMD at a same time spot;
   determining a disparity between the third image and the fourth image; and
   determining a length of a baseline between the first camera and the second camera according to the disparity and the depth information.

4. The 3D reconstruction method of claim 1, wherein a motion between a HMD orientation of the HMD at the first time spot to a camera orientation of the first camera at the second time spot is equivalent to a first path to rotate a HMD orientation of the HMD at the first time spot for the HMD rotation amount first and for the relative rotation amount subsequently and is also equivalent to a second path to rotate the HMD orientation of the HMD at the first time spot for the relative rotation amount first and for the first camera rotation amount subsequently.

5. The 3D reconstruction method of claim 4, wherein the step of calculating the relative rotation amount further comprises:
   applying Euclidean transformation matrix to describe the first path and the second path to obtain an equation; and
   calculating the relative rotation amount by solving the equation.

6. The 3D reconstruction method of claim 5, wherein a HMD motion of the HMD between the first time spot and the second time spot is decomposed to a HMD displacement corresponding to the HMD displacement vector and a HMD rotation corresponding to the HMD rotation amount, and the step of calculating the relative displacement vector further comprises:
   decomposing a camera motion of the first camera between the first time spot and the second time spot to a first displacement identical to the HMD displacement vector that displaces to a temporary position and a second displacement corresponding to a displacement vector; and
   calculating the relative displacement vector based on a relation of the relative rotation amount, the relative displacement vector, the HMD displacement vector and the HMD rotation amount.

7. A 3D reconstruction apparatus used in a head-mounted device (HMD) comprising:
   a storage module configured to store a plurality of computer-executable instructions;
   a signal receiver;
   a first camera; and
   a processing module electrically coupled to the storage module and the signal receiver and configured to retrieve and execute the computer-executable instructions to perform a 3D reconstruction method when the computer-executable instructions are executed, wherein the 3D reconstruction method comprises:
   receiving a plurality of positioning signals by the signal receiver HMD at a first time spot and a second time spot to determine a HMD displacement vector and a HMD rotation amount according to the positioning signals;
   retrieving a first image at the first time spot and a second image at the second time spot by a first camera disposed at the HMD to determine a first camera rotation amount according to the first image and the second image;
   calculating a relative rotation amount and a relative displacement vector between the HMD and the first camera;
   calculating a first camera displacement vector of the first camera according to the HMD displacement vector, the HMD rotation amount, the relative rotation amount and the relative displacement vector;
   obtaining depth information of the first image and the second image based on the first camera displacement vector and the first camera rotation amount; and
   performing 3D reconstruction according to images retrieved by the first camera and the depth information.

8. The 3D reconstruction apparatus of claim 7, wherein the HMD rotation amount and the first camera rotation amount are expressed as a 3D rotation amount, a quaternion or a rotation matrix.

9. The 3D reconstruction apparatus of claim 7, wherein the 3D reconstruction method further comprises:
   retrieving a third image by the first camera and a fourth image by a second camera disposed at the HMD at a same time spot;
   determining a disparity between the third image and the fourth image; and
   determining a length of a baseline between the first camera and the second camera according to the disparity and the depth information.

10. The 3D reconstruction apparatus of claim 7, wherein a motion between a HMD orientation of the HMD at the first time spot to a camera orientation of the first camera at the second time spot is equivalent to a first path to rotate a HMD orientation of the HMD at the first time spot for the HMD rotation amount first and for the relative rotation amount subsequently and is also equivalent to a second path to rotate the HMD orientation of the HMD at the first time spot for the relative rotation amount first and for the first camera rotation amount subsequently.

11. The 3D reconstruction apparatus of claim 10, wherein the step of calculating the relative rotation amount further comprises:
applying Euclidean transformation matrix to describe the first path and the second path to obtain an equation; and
calculating the relative rotation amount by solving the equation.

12. The 3D reconstruction apparatus of claim 11, wherein a HMD motion of the HMD between the first time spot and the second time spot is decomposed to a HMD displacement corresponding to the HMD displacement vector and a HMD rotation corresponding to the HMD rotation amount, and the step of calculating the relative displacement vector further comprises:
decomposing a camera motion of the first camera between the first time spot and the second time spot to a first displacement identical to the HMD displacement vector that displaces to a temporary position and a second displacement corresponding to a displacement vector; and
calculating the relative displacement vector based on a relation of the relative rotation amount, the relative displacement vector, the HMD displacement vector and the HMD rotation amount.

13. A non-transitory computer readable storage medium that stores a computer program comprising a plurality of computer-executable instructions to perform a 3D reconstruction method used in a 3D reconstruction apparatus used in a head-mounted device, the 3D reconstruction apparatus at least comprises a storage module, a signal receiver, a first camera and a processing module electrically coupled to the storage module, the signal receiver and the first camera and configured to retrieve and execute the computer-executable instructions to perform the 3D reconstruction method when the computer-executable instructions are executed, wherein the 3D reconstruction method comprises:
receiving a plurality of positioning signals by the signal receiver disposed at a head mounted device (HMD) at a first time spot and a second time spot to determine a HMD displacement vector and a HMD rotation amount according to the positioning signals;
retrieving a first image at the first time spot and a second image at the second time spot by the first camera disposed at the HMD to determine a first camera rotation amount according to the first image and the second image;
calculating a relative rotation amount and a relative displacement vector between the HMD and the first camera;
calculating a first camera displacement vector of the first camera according to the HMD displacement vector, the HMD rotation amount, the relative rotation amount and the relative displacement vector;
obtaining depth information of the first image and the second image based on the first camera displacement vector and the first camera rotation amount; and
performing 3D reconstruction according to images retrieved by the first camera and the depth information.

14. The non-transitory computer readable storage medium of claim 13, wherein the HMD rotation amount and the first camera rotation amount are expressed as a 3D rotation amount, a quaternion or a rotation matrix.

15. The non-transitory computer readable storage medium of claim 13, wherein the 3D reconstruction method further comprises:
retrieving a third image by the first camera and a fourth image by a second camera disposed at the HMD at a same time spot;
determining a disparity between the third image and the fourth image; and
determining a length of a baseline between the first camera and the second camera according to the disparity and the depth information.

16. The non-transitory computer readable storage medium of claim 13, wherein a motion between a HMD orientation of the HMD at the first time spot to a camera orientation of the first camera at the second time spot is equivalent to a first path to rotate a HMD orientation of the HMD at the first time spot for the HMD rotation amount first and for the relative rotation amount subsequently and is also equivalent to a second path to rotate the HMD orientation of the HMD at the first time spot for the relative rotation amount first and for the first camera rotation amount subsequently.

17. The non-transitory computer readable storage medium of claim 16, wherein the step of calculating the relative rotation amount further comprises:
applying Euclidean transformation matrix to describe the first path and the second path to obtain an equation; and
calculating the relative rotation amount by solving the equation.

18. The non-transitory computer readable storage medium of claim 17, wherein a HMD motion of the HMD between the first time spot and the second time spot is decomposed to a HMD displacement corresponding to the HMD displacement vector and a HMD rotation corresponding to the HMD rotation amount, and the step of calculating the relative displacement vector further comprises:
decomposing a camera motion of the first camera between the first time spot and the second time spot to a first displacement identical to the HMD displacement vector that displaces to a temporary position and a second displacement corresponding to a displacement vector; and
calculating the relative displacement vector based on a relation of the relative rotation amount, the relative displacement vector, the HMD displacement vector and the HMD rotation amount.

* * * * *